United States Patent
Zhao

(10) Patent No.: US 9,466,070 B2
(45) Date of Patent: Oct. 11, 2016

(54) SYSTEM AND METHOD FOR EXECUTING A BUSINESS PROCESS WORKFLOW

(75) Inventor: Howard Zhao, Palo Alto, CA (US)

(73) Assignee: RESPONSYS, INC., San Bruno, CA (US)

( * ) Notice: Subject to any disclaimer, the term of this patent is extended or adjusted under 35 U.S.C. 154(b) by 243 days.

(21) Appl. No.: 12/985,269

(22) Filed: Jan. 5, 2011

(65) Prior Publication Data

US 2012/0173340 A1 Jul. 5, 2012

(51) Int. Cl.
*G06Q 30/00* (2012.01)
*G06Q 30/02* (2012.01)
*G06Q 10/06* (2012.01)

(52) U.S. Cl.
CPC ...... *G06Q 30/0251* (2013.01); *G06Q 30/0269* (2013.01); *G06Q 10/06* (2013.01); *G06Q 30/02* (2013.01)

(58) Field of Classification Search
CPC .. G06Q 30/02; G06Q 30/0269; G06Q 10/00; G06Q 10/0631; G06Q 10/06312; G06Q 10/0633; G06Q 30/0251; G06Q 10/06
USPC ..................... 705/14.1, 7.15, 7.27
See application file for complete search history.

(56) References Cited

U.S. PATENT DOCUMENTS

| | | | | |
|---|---|---|---|---|
| 5,826,239 | A * | 10/1998 | Du et al. ..... | 705/7.26 |
| 8,090,612 | B2 * | 1/2012 | Chao et al. ..... | 705/7.29 |
| 8,510,264 | B1 * | 8/2013 | Tamm et al. ..... | 707/608 |
| 8,775,448 | B2 | 7/2014 | Tuatini et al. | |
| 2003/0144898 | A1 | 7/2003 | Bibelnieks et al. | |
| 2004/0204973 | A1 | 10/2004 | Witting et al. | |
| 2005/0192986 | A1 | 9/2005 | Butler | |
| 2006/0253318 | A1 | 11/2006 | Ramsey et al. | |
| 2007/0208602 | A1 * | 9/2007 | Nocera et al. ..... | 705/8 |
| 2007/0250505 | A1 * | 10/2007 | Yang et al. ..... | 707/7 |
| 2008/0027788 | A1 | 1/2008 | Lawrence et al. | |
| 2008/0040191 | A1 | 2/2008 | Chakravarty et al. | |
| 2008/0065435 | A1 * | 3/2008 | Ratzloff ..... | 705/7 |
| 2008/0262925 | A1 * | 10/2008 | Kim et al. ..... | 705/14 |
| 2010/0250477 | A1 | 9/2010 | Yadav | |
| 2010/0274661 | A1 | 10/2010 | Aaltonen et al. | |
| 2011/0282735 | A1 | 11/2011 | Kordis et al. | |
| 2012/0130802 | A1 | 5/2012 | Shimizu | |
| 2012/0191546 | A1 | 7/2012 | Phelan et al. | |

FOREIGN PATENT DOCUMENTS

WO  WO 03036420 A2 * 5/2003

OTHER PUBLICATIONS

Non-Final Office Action for U.S. Appl. No. 13/229,610 dated Oct. 4, 2013.
Non-Final Office Action for U.S. Appl. No. 13/229,610 dated Jul. 18, 2012.

(Continued)

*Primary Examiner* — Bennett Sigmond
*Assistant Examiner* — Christopher Stroud
(74) *Attorney, Agent, or Firm* — Vista IP Law Group, LLP; Peter Mei

(57) ABSTRACT

A method for updating records associated with work items within a business process workflow according to embodiments of the invention, includes the steps of processing the work items according to the business process workflow, and updating a record associated with a group of work items as the group of work items transitions from a first state to a second state within the business process workflow.

22 Claims, 5 Drawing Sheets

(56) References Cited

OTHER PUBLICATIONS

Final Office Action for U.S. Appl. No. 13/229,610 dated Jan. 31, 2013.
Non-final Office Action dated Oct. 17, 2014 for U.S. Appl. No. 13/229,610.
Final Office Action dated May 26, 2015 for U.S. Appl. No. 13/229,610.
FrancescoChemolli, SquidFaq, InnerWorkings, Squid Web Proxy Wiki, Oct. 27, 2013, 17 pages.
Twilio, Inc., "TwiML Message: Twilio's Request", Mar. 26, 2013, 2 pages.
Mobivate, "psms aggregator", Jan. 14, 2013, 3 pages.
Ford, "IT Research BYTE" LOL: Laugh out Loud or Lots of Love? Integrating SMS into Ford Business Processes, Jun. 25, 2010, 6 pages.
Tata Communications, "Mobile Messaging Exchange", 2013, 2 pages.
ExactTarget, "SMS Marketing Term of the Day: Aggregator", Jun. 30, 2009, 3 pages.
Aruhat, "SMS Aggregators: Make sure that your gateways are the best used to give Excellent Services", Mar. 28, 2014, 6 pages.
Non-final Office Action dated Sep. 25, 2015 for related U.S. Appl. No. 13/229,610.
International Search Report and Written Opinion dated Oct. 15, 2015 for related PCT Patent Application No. PCT/US2015/040225, 11 pages.
Edith Cohen, et al., "Refreshment policies for Web content caches", Computer Networks, Nov. 8, 2001, 14 pages.
Non-final Office Action dated Dec. 21, 2015 for related U.S. Appl. No. 14/029,390.
Alkis Simitsis, "Optimizing Analytic Data Flows for Multiple Execution Engines", May 20-24, 2012.
Notice of Allowance and Fee(s) due dated May 3, 2016 for related U.S. Appl. No. 14/029,390.

\* cited by examiner

Group Table

| Group ID | Stage ID | State ID | Expiration |
|---|---|---|---|
| 001 | Email | Execute | (NULL) |
| 002 | Email | Wait | 12/10/2010 |
| ... | | | |

FIG. 4A

Group Member Table

| Group ID | Member ID |
|---|---|
| 001 | Mem001 |
| 001 | Mem002 |
| 001 | Mem003 |
| 002 | Mem004 |
| 002 | Mem005 |
| ... | ... |

FIG. 4B

SYSTEM AND METHOD FOR EXECUTING A BUSINESS PROCESS WORKFLOW

BACKGROUND

1. Field of the Invention

The present invention relates to the field of business process management, and, in particular, to a system and method for executing a business process workflow.

2. Description of the Related Art

A business process management (BPM) engine, or workflow engine, can be used to design and implement business execution actions, such as marketing campaigns, compensation calculation models, and supply chain management. In the marketing campaign example, a marketer can use the BPM engine to configure a series of connected workflow execution components that make up a marketing campaign. Some BPM engines allow the marketer to visually design, manage, and automate a multi-stage lifecycle marketing program through a drag-and-drop user interface and a library of pre-built program templates.

However, existing workflow execution components are designed for a business execution action that contains a small number of work items. For a business execution action that contains a large number of work items, e.g., on the order of millions or billions of work items, existing workflow execution components either fail due to system overload or introduce unreasonable delays. For example, traditional workflow execution components cannot effectively process an email marketing campaign directed to each of millions of users.

Accordingly, there remains a need in the art for a technique that addresses the drawbacks and limitations discussed above.

SUMMARY

Embodiments of the invention provide a technique for executing a business process workflow for a large number of work items with a relatively small amount of resource usage and minimal delays. According to embodiments of the invention, work items that share the same workflow state, which may number in the millions or even billions, are grouped together, and transitions between states are managed by a single change to a record associated with the group. In one embodiment, a relational database can be used to store and manage group state and group membership of the work items.

A method for updating records associated with work items within a business process workflow according to embodiments of the invention includes the steps of processing the work items according to the business process workflow, and updating a record associated with a group of work items as the group of work items transitions from a first state to a second state within the business process workflow.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4B are conceptual diagrams of database tables used to implement various embodiments of the invention.

DETAILED DESCRIPTION OF EXEMPLARY EMBODIMENTS

Embodiments of the invention provide a technique for executing a business process workflow for a large number of work items with a relatively small amount of resource usage and minimal delays. According to embodiments of the invention, work items that share the same workflow state, which may number in the millions or even billions, are grouped together, and transitions between states are managed by a single change to a record associated with the group. In one embodiment, a relational database can be used to store and manage group state and group membership of the work items.

Hardware Overview

Figure 1:
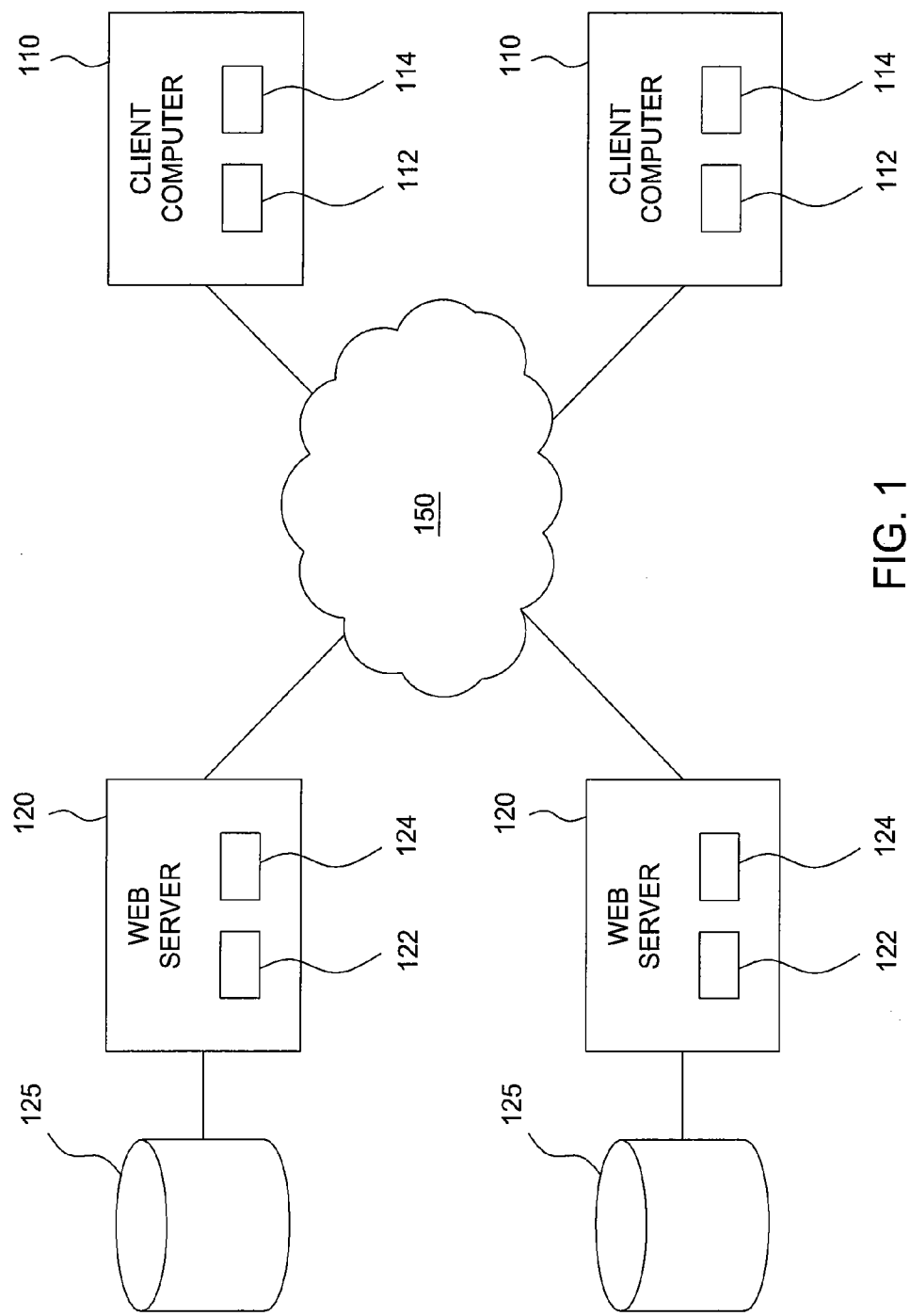
FIG. 1 illustrates a networked computer environment in which embodiments of the invention may be practiced.

FIG. 1 illustrates a networked computer environment in which embodiments of the invention may be practiced. As shown, the networked computer environment includes a plurality of client computers 110 (only two of which are shown) and a plurality of web servers 120 with associated content storage units 125. The client computers 110 and the web server computers 120 are connected over a computer network 150, e.g., the Internet.

Each client computer 110 includes conventional components of a computing device, e.g., a processor 112, system memory 114, a hard disk drive, input devices such as a mouse and a keyboard, and output devices such as a monitor, among others. Each web server 120 includes a processor 122 and a system memory 124, and manages the contents stored in its respective content storage unit using a relational database. The web server is programmed to communicate with the client computers 110 and other web servers using the TCP/IP protocol. The client computers 110 are programmed to execute web browser programs and other software applications and access the web pages and/or applications managed by the web servers by specifying a uniform resource locator (URL) for the web server into the browser.

In the embodiments of the present invention described below, users are respectively operating the client computers 110 that are connected to the web servers 120 over the Internet. The web pages that are displayed to a user are transmitted from the web servers 120 to that user's client computer 110 and processed by the web browser program stored in that user's client computer 110 for display through the monitor of that user's client computer 110.

Client computer 110 may be a personal computer, smart phone, touch pad, touch screen, or any other device suitable for practicing one or more embodiments of the present invention. It should be noted that the present invention can be implemented in hardware, software, or in a combination of hardware and software, e.g., using application specific integrated circuits (ASIC), a general purpose computer or any other hardware equivalents.

In one embodiment, a BPM engine is stored in the memory 114 of the client computer 110 and is executed by the processor 112. In other embodiments, the BPM engine is stored in the memory 124 of the web server 120 and is executed by the processor 122. The web server 120 may be configured to deliver a user interface to the user at the client computer 110 via the network 150. For example, the user interface may be displayed in a web browser executed by the client computer 110.

Efficient Workflow Execution

As described, embodiments of the invention provide a technique for executing a business process workflow for a large number of work items with a relatively small amount of resource usage and minimal delays. According to embodiments of the invention, work items that share the same workflow state, which may number in the millions or even billions, are grouped together, and transitions between states are managed by a single change to a record associated with the group.

Figure 2:
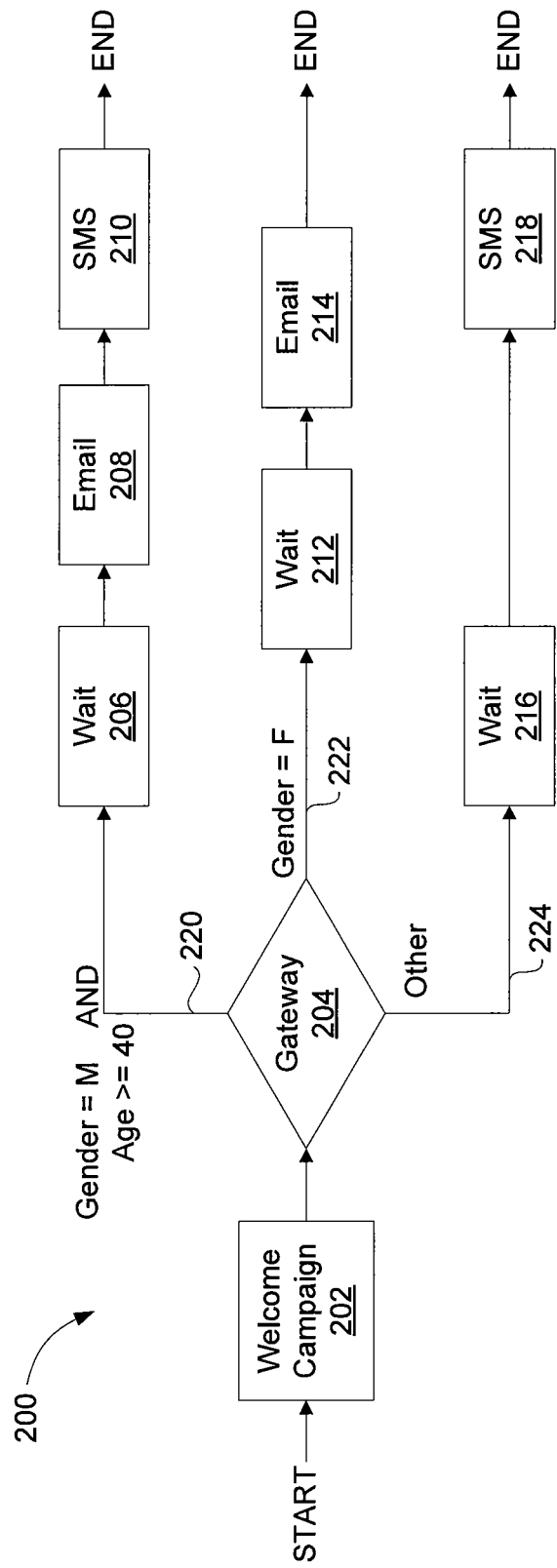
FIG. 2 is a conceptual diagram of a business process workflow, according to one embodiment of the invention.

FIG. 2 is a conceptual diagram of a business process workflow 200, according to one embodiment of the invention. In one embodiment, a BPM engine allows a user to visually design, manage, and automate a multi-stage life-cycle program through a drag-and-drop user interface and a library of pre-built program templates. The example shown in FIG. 2 illustrates a marketing campaign designed by a marketer.

As shown, the business process workflow 200 begins with stage 202, which comprises a "welcome campaign" stage. In one embodiment, a stage is an abstract class that represents a component within the business process workflow 200. Examples of stages include an email campaign stage, an SMS (short message service) campaign stage, an elapsed timer stage, a gateway (or "switch") stage, or any other technically feasible type of stage. In some embodiments, different business logic may be associated with each of the different types of stages.

The input to the welcome campaign stage 202 comprises a plurality of work items, also referred to as "process instances" or "enactments." Initially, each of the work items is grouped together in a single group of work items. In the example shown in FIG. 2, each work item represents a different user to which the marketing campaign is targeted.

In one embodiment, at the welcome campaign stage 202, each work item (i.e., each user) in the group receives a welcome email. The number of work items may be quite large, i.e., on the order of millions or billions of work items. In some embodiments, an optimized technique for sending mass emails may be used in conjunction with embodiments of the invention in order to efficiently deliver emails to a large number of recipients. Various techniques are known in the art for sending mass emails.

Figure 3:
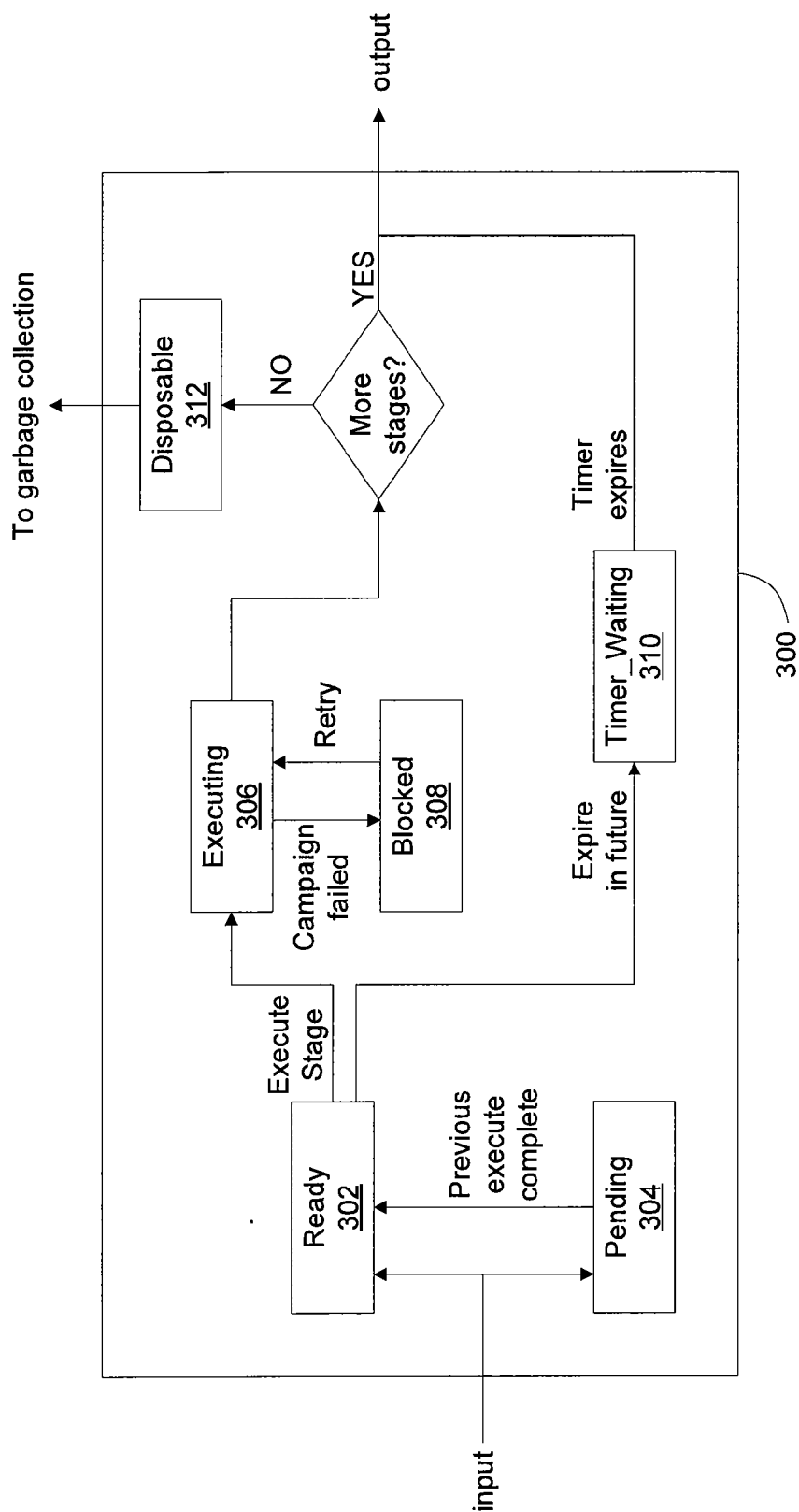
FIG. 3 is a conceptual diagram of a state transition diagram between states included within a stage of the business process workflow, according to one embodiment of the invention.

In some embodiments, a stage, such as the welcome campaign stage 202 included in the business process workflow 200, may include multiple "states" within the stage connected with a state transition diagram. FIG. 3 is a conceptual diagram of a state transition diagram between states included within a stage of the business process workflow, according to one embodiment of the invention.

A group of work items is input into the stage 300. In the embodiment shown, the stage 300 includes a ready state 302, a pending state 304, an executing state 306, a blocked state 308, a timer waiting state 310, and a disposable state 312.

At the ready state 302, the group of work items is ready for execution of the stage 300. When a group of work items is initially created and the stage 300 is the first stage of the business process workflow, the group is in ready state 302. When an entire group of work items moves from a previous stage to current stage together, the group is in ready state 302.

At the pending state 304, the stage 300 is buffering membership and is not ready for execution. For example, assume that the previous stage was an SMS campaign stage. In an SMS campaign stage, SMS messages are sent synchronously one at a time to each recipient in the group. As SMS messages are sent, the recipients that receive a successful transmission are moved to the pending state 304 of the next stage 300. Once the previous stage has completed executing (e.g., all of the recipients in the previous stage have received a successful SMS transmission), the state of the group transitions to the ready state 302, described above.

At the executing state 306, the stage 300 is executing on the group of work items. For example, in an email campaign stage, the executing state 306 is associated with sending emails to each recipient in the group, and in an SMS campaign stage, the executing state 306 is associated with sending SMS messages to each recipient in the group.

At the blocked state 308, the group of work items has failed execution, i.e., an error has occurred. Some embodiments of the invention provide technical support to cure the error and/or the ability to manually re-launch or retry a failed campaign.

After the executing state 306 is complete, if additional stages exist in the business process workflow, then the group state transitions to the "ready state" for the next stage of the business process workflow. If no additional stages exist, then the group state transitions to the disposable state 312. A group of work items becomes disposable when the stage 300 is the last stage of the business process workflow or when there are no subsequent stages. A garbage collection process can be scheduled to perform garbage collection at a low load time and can delete the group membership and group for this stage 300.

The timer waiting state 310 is associated with a stage 300 that is an "elapsed time" stage having a future expiration date. For example, the stage 300 may be associated with a timer that causes a wait time of 30 days to pass before proceeding to the next stage of the business process workflow. When the expiration time has passed, the group state transitions to the "ready state" for the next stage of the business process workflow.

Although the stage 300 described in FIG. 3 is shown having particular states and state transitions, many other implementations of the stage are also within the scope of embodiments of the invention. For example, the stage can include different states, different transitions between states, or can be implemented in any technically feasible manner, which may not include states.

FIGS. 4A-4B are conceptual diagrams of database tables used to implement various embodiments of the invention. FIG. 4A shows a group table and FIG. 4B shows a group member table. The group table shown in FIG. 4A includes columns for group identifier, stage identifier, state identifier, and expiration. Each group of work items is associated with a particular group identifier. Each group is also associated with a particular combination of stage identifier and state identifier. As a group of work items is processed through a stage and transitions between the different states within the stage, the state identifier and/or the stage identifier can be updated for the group record in the group table. In this manner, only a single update to the group table is necessary when a group of work items transitions between states within a stage, regardless of the number of work items included in the group. This technique is in contrast to prior art techniques, where an individual record is associated with each individual work item and such record is updated when the work item is processed through the various states in a stage. Such prior art techniques could require millions or even billions of updates to be performed, whereas embodiments of the invention can cause a group of work items to transition to a different state with only a single update.

When the stage is associated with a timer, as described in relation to the timer waiting state 310, the expiration column in the group table identifies the timer expiration for the state. Once the timer reaches the expiration time, the group state transitions to the ready state of the subsequent stage, as described above. When the stage is not a timer stage, the expiration column may be NULL for a particular group.

Referring back to FIG. 2, the next stage in the business process workflow 200 after the welcome campaign stage 202 is the gateway stage 204, also referred to as a "switch" stage. At a gateway stage, the group of work items that is input into the stage is divided into subgroups based on filters placed at the two or more outputs of the gateway stage. For example, a first filter may filter out those work items (e.g., users) associated with a gender equal to "male" and an age greater than or equal to 40 years old. A second filter may filter out those work items associated with a gender equal to "female." The remaining work items that do not satisfy either the first or second filters then would constitute the group of male users under age 40. In one embodiment, the gateway stage 204 is configured so that certain filters have priority over other filters, and a work item is grouped with other work items based on the highest priority filter that the work item satisfies. In other words, the gateway stage 204 functions like an "if-then-else" statement.

In the example shown, the group of work items that satisfies the first filter is passed along path 220 to wait stage 206. The group of work items that satisfies the second filter is passed along path 222 to wait stage 212. The remaining group of work items is passed along path 224 to wait stage 216.

FIG. 4B is a conceptual diagram of a group member table. In some embodiments, the group member table may include a group identifier column and a member identifier column. As described in relation to the group table shown in FIG. 4A, the group identifier corresponds to a group of work items that is associated with a particular stage and state combination. The particular group to which a work item belongs is identified in the group member table. In the example shown, members Mem001, Mem002, and Mem003 belong to the group having group identifier "001," and members Mem004 and Mem005 belong to the group having group identifier "002."

When the business process workflow 200 encounters a gateway stage, such as gateway stage 204, the group memberships of one or more members can be updated to reflect the filtering associated with the gateway stage 204. For example, as shown in the example in FIG. 2, the gateway stage 204 receives a group of work items and divides the group of work items into three subgroups. A first subgroup is associated with the work items that satisfy the first filter, a second subgroup is associated with the work items that satisfy the second filter, and a third subgroup is associated with the other work items that satisfy neither the first filter nor the second filter. To divide the group of work items into subgroups, the group member table shown in FIG. 4B can be updated to reflect the new group memberships of the work items (e.g., by updating the Group ID column in the Group Member Table).

As shown in FIG. 2, the first subgroup of work items that satisfies the first filter is passed to the wait stage 206. As described above in relation to the timer waiting state 310 included in a stage, the wait stage 206 may be associated with waiting for a predetermined period of time (e.g., 7 days or 30 days) before the first subgroup is passed to the next stage in the workflow. Once the requisite time has passed, the first subgroup transitions to the email campaign stage 208. At the email campaign stage 208, an email, such as a marketing email, can be sent to the work items (i.e., users) in the first subgroup. At the SMS campaign stage 210, an SMS, such as a marketing SMS, can be sent to the work items (i.e., users) in the first subgroup.

Similarly, the second subgroup of work items that satisfies the second filter is passed to the wait stage 212. The wait stage 212 is associated with waiting for a predetermined period of time before the second subgroup is passed to the next stage in the workflow. The expiration time of the wait stage 212 can be the same or different as the expiration time of the wait stage 206. Once the requisite time has passed, the second subgroup transitions to the email campaign stage 214. At the email campaign stage 214, an email, such as a marketing email, can be sent to the work items (i.e., users) in the second subgroup. The email that is sent in conjunction with the email stage 214 associated with second subgroup can be the same or different as the email that is sent in conjunction with the email stage 208 associated with first subgroup.

The third subgroup of work items is passed to the wait stage 216. Again, the wait stage 216 is associated with waiting for a predetermined period of time before the third subgroup is passed to the next stage in the workflow. The expiration time of the wait stage 216 can be the same or different as the expiration time of the wait stages 206 and 212. Once the requisite time has passed, the second subgroup transitions to the SMS campaign stage 218. At the SMS campaign stage 218, an SMS, such as a marketing SMS, can be sent to the work items (i.e., users) in the third subgroup. The SMS that is sent in conjunction with the SMS campaign stage 218 associated with the third subgroup can be the same or different as the SMS that is sent in conjunction with the SMS stage 210 associated with the first subgroup.

Each of the subgroups described above could be implemented as a separate entry in the group table shown in FIG. 4A. Each work item included in the individual subgroups is identified as belonging to the subgroup in group member table shown in FIG. 4B. As a subgroup moves through the different stages, and states within the stages, of the business process workflow, the record associated with the subgroup can be updated in the group table to reflect the movement of the group. Accordingly, for each transition, only a single record is updated in the group table to reflect the transition of each of the members of the subgroup to a different stage and/or state in the business process workflow.

The example business process workflow shown in FIG. 2 is merely exemplary and many other business process workflows are also within the scope of embodiments of the invention. For example, some business process workflows could include branching stages that divide a group into subgroups, merging stages that merge two subgroups into a larger group, loops, or any other technically feasible architecture. For example, for the merging group, as long as the two subgroups are being merged have the same stage and state within the business process workflow, the subgroups can be merged into a larger group (e.g., by updating the Group ID column in the Group Member Table).

Figure 5:
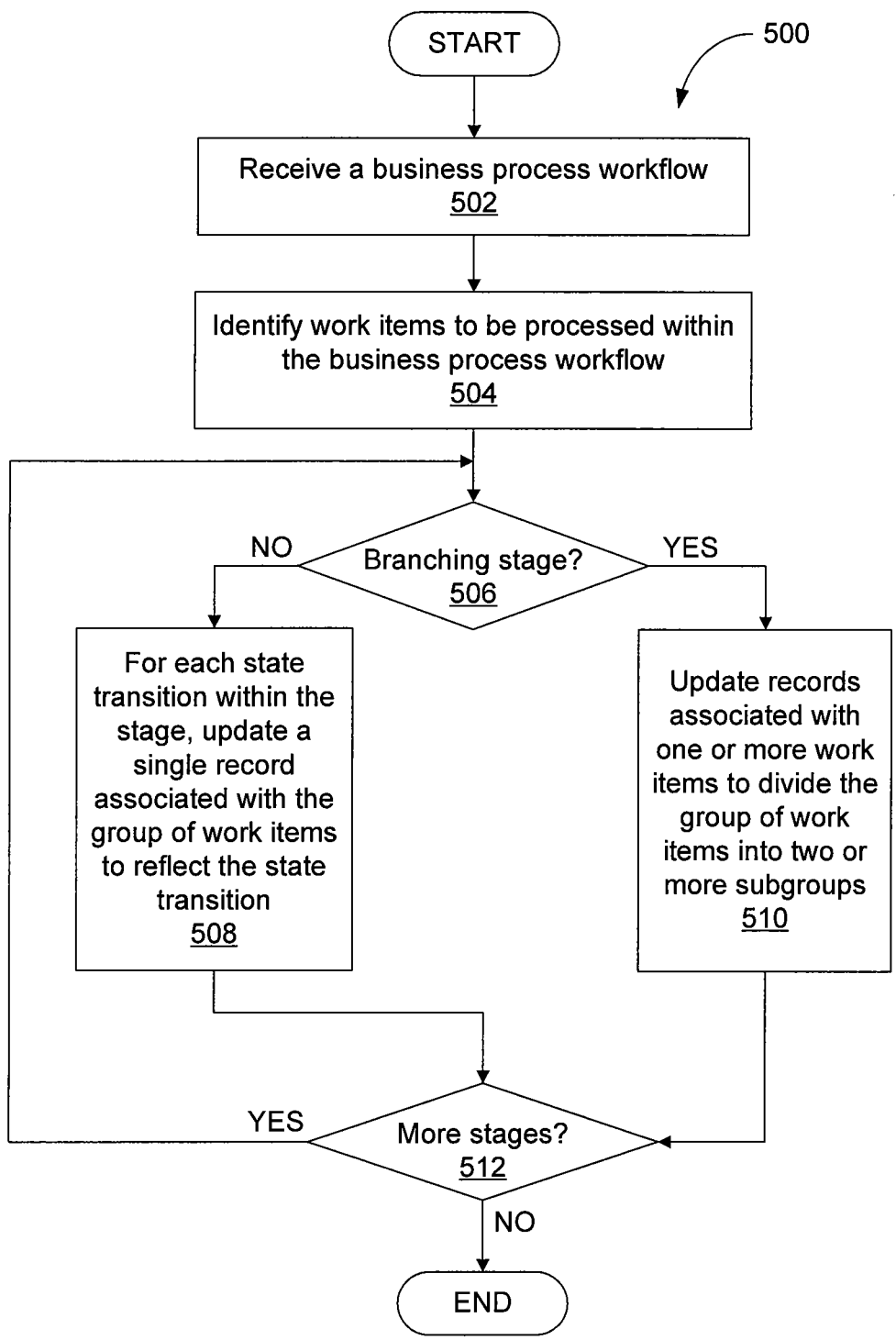
FIG. 5 is a flow diagram of method steps for executing a business process workflow, according to one embodiment of the invention.

FIG. 5 is a flow diagram of method steps for executing a business process workflow, according to one embodiment of the invention. Persons skilled in the art will understand that, even though the method 500 is described in conjunction with the systems of FIGS. 1-4B, any system configured to perform the method steps, in any order, is within the scope of embodiments of the invention.

As shown, the method 500 begins at step 502, where a processor receives a business process workflow. In some embodiments, the business process workflow may have been designed by a user of BPM software that allows the user to visually design, manage, and automate a multi-stage business process workflow through a drag-and-drop user interface and a library of pre-built workflow templates. FIG. 2 shows an example of a business process workflow for a marketing campaign.

At step 504, the processor identifies work items to be processed within the business process workflow. Initially, all of the work items to be processed within the business process workflow are grouped together into a single group. A record associated with the group can be placed in a group table stored in a database or other memory. Each work item is also listed in a group member table stored in a database or other memory as being a member of the group.

At step 506, the processor determines whether a current stage of the business process workflow is a branching stage. A branching stage is a stage at which a group of work items that is input into the stage is divided into subgroups of work items. If the processor determines that the current stage is not a branching stage, then the method 500 proceeds to step 508.

At step 508, for each state transition within the stage, the processor updates a single record associated with the group of work items to reflect the change in state. As described above in relation to FIGS. 3 and 4A, when a group transitions to a different state within a stage, a single record in the group table associated with the group is updated to reflect the new state of the group. Importantly, since only a single group-based record is updated, and not each record associated with each individual work item in the group, greater processing efficiency is achieved relative to prior art techniques.

At the completion of the current stage, at step 512, the processor determines whether any additional stages exist in the business process workflow. If the processor determines that more stages exist, then the method 500 returns to step 506, described above. If the processor determines that no more stages exist, then the method 500 terminates.

Referring back to step 506, if the processor determines that the current stage is a branching stage, then the method 500 proceeds to step 510. At step 510, the processor updates records associated with one or more work items to divide the work items into two or more subgroups. An example of a branching stage is the gateway stage 204 shown in FIG. 2. The gateway stage 204 is associated with three output branches corresponding to three different subgroups. As described, individual work items are placed into one of the three output subgroups based on whether the work items are associated with one or more attributes that correspond to one or more matching criteria.

In one embodiment, each new subgroup is created and added to the group table shown in FIG. 4A. In one embodiment, the original group that included all of the work items that was input to the branching stage is deleted from the group table and new subgroups are created. Records for the new subgroups are added to the group table. In another embodiment, the original group remains in the group table following the branching stage and corresponds to one of the subgroups output from the branching stage.

To update the group memberships of the work items at the branching stage, the group identifier in the group member table shown in FIG. 4B can be updated to reflect the modified group memberships. As shown in the example in FIG. 4B, work items Mem001, Mem002, and Mem003 belong to the group having group identifier "001," and work items Mem004 and Mem005 belong to the group having group identifier "002".

After step 510, the method 500 proceeds to step 512, described above.

Although the method 500 is described in the context of a marketing campaign, such a use is merely exemplary. For example, the method 500 can also be applied to support setting data, including setting profile data and customer transactional data. Setting data is a versatile tool that allows the customer to set parameter values and can be a valuable tool to mark recipient segmentation, among other uses.

In sum, embodiments of the invention provide a technique for executing a business process workflow for a large number of work items with a relatively small amount of resource usage and minimal delays. According to embodiments of the invention, work items that share the same workflow state, which may number in the millions or even billions, are grouped together and transitions between states are managed by a single change to a record associated with the group. In one embodiment, a relational database can be used to store and manage group state and group membership of the work items.

Advantageously, the computational resources required to execute a business process workflow are significantly reduced relative to prior art techniques. On a state transition within the business process workflow, conventional approaches would require an update to each record associated with each work item that is affected by the state transition. In contrast, embodiments of the invention can implement a state transition by updating only a single record associated with a group of work items to reflect the state transition. When millions or billions of work items are grouped together in group, the computing resource savings can be significant.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for updating database records associated with work items within a process workflow, the method comprising:

maintaining a group table and a member table in a relational database stored in a non-volatile content storage unit, the group table having a group-table ID column and a separate entry for each group of work items to be processed, the separate entry for each group of work items comprising a group-table ID in the group-table ID column, and the member table having entries that identify group members and a member-table ID in a member-table ID column;

processing the work items according to the process workflow via one or more processors, wherein the processing includes:

identifying a group of work items to be processed by matching the group-table ID to a plurality of member-table IDs, the group of work items corresponding to electronic communications to be transmitted over the internet to one or more destination computing devices, the work items are processed synchronously and transitioned as a group between one or more stages corresponding to subsets of one or more steps of the process workflow, and the stages for the work items correspond to the stages of a communications process;

dividing the group of work items into two or more subgroups of work items to be processed in distinct branches of the process workflow by creating a new entry in the group table and a corresponding new group-table ID, and updating the member-table ID column of corresponding entries of the member table with the new group-table ID for members of at least one of the two or more subgroups;

maintaining database records in the group table on a group basis for the two or more subgroups of work items;

processing a subgroup of the two or more subgroups of work items by sending one or more corresponding electronic communications; and transitioning the subgroup of the two or more subgroups of work items between states of the process workflow, the transitioning providing tracking of the work items by updating the database records in the group table on a group basis for the subgroup of work items and not individually updating each record associated with the work items corresponding to the sent electronic communications, wherein when the subgroup transitions to a different state of the process workflow, only a single entry in the group table is required to be updated for the entry in the group table to reflect a movement of the subgroup of work items to the different state and not performing separate updates for each work item regardless of a number of work items in the subgroup of work items, the single entry having a corresponding group-table ID in the group-table ID column that matches the member-table ID in the member-table ID column for the subgroup of work items.

2. The method of claim 1, wherein processing a subgroup comprises sending marketing content to recipients associated with the subgroup and the marketing content includes marketing emails sent to the work items in the subgroup.

3. The method of claim 1, wherein processing a subgroup comprises sending marketing content to recipients associated with the subgroup and the marketing content includes SMS (short message service) messages sent to the recipients associated with the work items in the subgroup.

4. The method of claim 1, wherein updating the database records on a group basis comprises updating a single database record associated with the subgroup of work items to reflect the subgroup of work items transitioning between states and stages.

5. The method of claim 1, wherein the group of work items is divided into the subgroups based on group matching criteria.

6. The method of claim 5, wherein dividing the group of work items into subgroups comprises updating respective database records associated with the work items to reflect changes in group membership of the work items.

7. The method of claim 1, wherein the processing further includes merging the two or more subgroups of work items when the respective records indicate that the subgroups are at a same state and a same stage within the process workflow.

8. The method of claim 1, wherein processing a subgroup comprises waiting a given period of time.

9. The method of claim 1, wherein processing a subgroup comprises a disposal stage which is the last state of the process workflow.

10. A non-transitory computer-readable medium storing instructions that, when executed by a processor, cause a computer system to update database records associated with work items within a process workflow, by performing the steps of:

maintaining a group table and a member table in a relational database stored in a non-volatile content storage unit, the group table having a group-table ID column and a separate entry for each group of work items to be processed, the separate entry for each group of work items comprising a group-table ID in the group-table ID column, and the member table having entries that identify group members and a member-table ID in a member-table ID column;

processing the work items according to the-process workflow via one or more processors, wherein the processing includes:

identifying a group of work items to be processed by matching the group-table ID to a plurality of member-table IDs, the group of work items corresponding to electronic communications to be transmitted over the internet to one or more destination computing devices, the work items are processed synchronously and transitioned as a group between one or more stages corresponding to subsets of one or more steps of the process workflow, and the stages for the work items correspond to the stages of a communications process;

dividing the group of work items into two or more subgroups of work items to be processed in distinct branches of the process workflow by creating a new entry in the group table and a corresponding new group-table ID, and updating the member-table ID column of corresponding entries of the member table with the new group-table ID for members of at least one of the two or more subgroups;

maintaining database records in the group table on a group basis for the two or more subgroups of work items;

processing a subgroup of the two or more subgroups of work items by sending one or more corresponding electronic communications; and transitioning the subgroup of the two or more subgroups of work items between states of the process workflow, the transitioning providing tracking of the work items by updating the database records in the group table on a group basis for the subgroup of work items and not individually updating each record associated with the work items corresponding to the sent electronic communications, wherein when the subgroup transitions to a different state of the process workflow, only a single entry in the group table is required to be updated for the entry in the group table to reflect a movement of the subgroup of work items to the different state and not performing separate updates for each work item regardless of a number of work items in the subgroup of work items, the single entry having a corresponding group-table ID in the group-table ID column that matches the member-table ID in the member-table ID column for the subgroup of work items.

11. The computer-readable medium of claim 10, wherein processing a subgroup comprises sending marketing content to recipients associated with the subgroup and the marketing content includes marketing emails sent to the work items in the subgroup.

12. The computer-readable medium of claim 10, wherein processing a subgroup comprises sending marketing content to recipients associated with the subgroup and the marketing content includes SMS (short message service) messages sent to the recipients associated with the work items in the subgroup.

13. The computer-readable medium of claim 10, wherein updating the database records on a group basis comprises updating a single database record associated with the subgroup of work items to reflect the subgroup of work items transitioning between states and stages.

14. The computer-readable medium of claim 10, wherein the group of work items is divided into the subgroups based on group matching criteria.

15. The computer-readable medium of claim 11, wherein dividing the group of work items into subgroups comprises updating respective database records associated with the work items to reflect changes in group membership of the work items.

16. The computer-readable medium of claim 10, wherein processing a subgroup comprises waiting a given period of time.

17. The computer-readable medium of claim 10, wherein processing a subgroup comprises a disposal stage which is the last state of the process workflow.

18. A computer system, comprising:

a processor configured to update database records associated with work items within a process workflow, by performing steps of:

maintaining a group table and a member table in a relational database stored in a non-volatile content storage unit, the group table having a group-table ID column and a separate entry for each group of work items to be processed, the separate entry for each group of work items comprising a group-table ID in the group-table ID column, and the member table having entries that identify group members and a member-table ID in a member-table ID column;

processing the work items according to the process workflow via one or more processors, wherein the processing includes:

identifying a group of work items to be processed by matching the group-table ID to a plurality of member-table IDs, the group of work items corresponding to electronic communications to be transmitted over the internet to one or more destination computing devices, the work items are processed synchronously and transitioned as a group between one or more stages corresponding to subsets of one or more steps of the process workflow, and the stages for the work items correspond to the stages of a communications process;

dividing the group of work items into two or more subgroups of work items to be processed in distinct branches of the process workflow by creating a new entry in the group table and a corresponding new group-table ID, and updating the member-table ID column of corresponding entries of the member table with the new group-table ID for members of at least one of the two or more subgroups;

maintaining database records in the group table on a group basis for the two or more subgroups of work items;

processing a subgroup of the two or more subgroups of work items by sending one or more corresponding electronic communications; and transitioning the subgroup of the two or more subgroups of work items between states of the process workflow, the transitioning providing tracking of the work items by updating the database records in the group table on a group basis for the subgroup of work items and not individually updating each record associated with the work items corresponding to the sent electronic communications, wherein when the subgroup transitions to a different state of the process workflow, only a single entry in the group table is required to be updated for the entry in the group table to reflect a movement of the subgroup of work items to the different state and not performing separate updates for each work item regardless of a number of work items in the subgroup of work items, the single entry having a corresponding group-table ID in the group-table ID column that matches the member-table ID in the member-table ID column for the subgroup of work items.

19. The computer system of claim 18, wherein the group of work items is divided into the subgroups based on group matching criteria.

20. The computer system of claim 18, wherein processing a subgroup comprises waiting a given period of time.

21. The computer system of claim 18, wherein processing a subgroup comprises a disposal stage which is the last state of the process workflow.

22. A method for executing a process workflow, comprising:

maintaining a group table and a member table in a relational database stored in a non-volatile content storage unit, the group table having a group-table ID column and a separate entry for each group of work items to be processed, the separate entry for each group of work items comprising a group-table ID in the group-table ID column, and the member table having entries that identify group members and a member-table ID in a member-table ID column;

receiving the process workflow;

identifying a group of work items to be processed within the process workflow by matching the group-table ID to a plurality of member-table IDs, the group of work items corresponding to electronic communications to be transmitted over the internet to one or more destination computing devices, the work items are processed synchronously and transitioned as a group between one or more stages corresponding to subsets of one or more steps of the process workflow, and the stages for the work items correspond to the stages of a communications process; and for each stage of the process workflow:
  determining if a current stage is a branching stage, and
  if the stage is a branching stage, updating database records associated with one or more of the work items to divide work items input into the branching stage into two or more subgroups which are processed in distinct branches of the process workflow by creating a new entry in the group table and a corresponding new group-table ID, and updating the member-table ID column of corresponding entries of the member table with new group-table ID for members of at least one of the two or more subgroups, wherein each of the two or more subgroups corresponds to separate entries in the group table and members of the two or more subgroups are identified in the member table, and
  if the stage is not a branching stage, providing tracking of the work items for each state transition within the stage by, updating a single entry in the group table associated with the group or subgroup and only requiring a single entry in the group table be updated to reflect a movement of the work items of the group or subgroup to a different state and not individually updating each record associated with the work items corresponding to the sent electronic communications and not performing separate updates for each work item regardless of a number of work items in a subgroup of work items, the single entry having a corresponding group-table ID in the group-table ID column that matches the member-table ID in the member-table ID column for the group or subgroup of work items, wherein the process workflow comprises a plurality of stages, each of the stages being one of a welcome stage in which input users receive welcome emails, a gateway stage in which input users are divided into subgroups based on filters, a wait stage in which no action is performed for a given amount of time, an email stage in which e-mails are sent to users input to the email stage, and a short message service (SMS) stage in which SMS messages are sent to users input to the SMS stage, and wherein each of the plurality of stages comprises a plurality of states, each of the states being one of a pending state in which membership in an input group is buffered, a ready state in which the input group is ready for execution of the stage, an executing state associated with sending e-mails or SMS messages, a waiting state in which a given period of time passes before transitioning to a next state, a blocked state in which execution has failed, and a disposable state which is the last state of the process workflow.

* * * * *